US012743467B2

(12) United States Patent
Sun et al.

(10) Patent No.: US 12,743,467 B2
(45) Date of Patent: Sep. 22, 2026

(54) DATA PROCESSING METHOD, DATA PROCESSING DEVICE, DATA PROCESSING APPARATUS, AND STORAGE MEDIUM

(71) Applicant: AMLOGIC (CHENG DU) CO., LTD., Chengdu (CN)

(72) Inventors: Hanyu Sun, Chengdu (CN); Haibo Wang, Chengdu (CN); Lingao Feng, Chengdu (CN)

(73) Assignee: AMLOGIC (CHENG DU) CO., LTD., Chengdu (CN)

( * ) Notice: Subject to any disclaimer, the term of this patent is extended or adjusted under 35 U.S.C. 154(b) by 148 days.

(21) Appl. No.: 18/967,691

(22) Filed: Dec. 4, 2024

(65) Prior Publication Data

US 2025/0190490 A1 Jun. 12, 2025

(30) Foreign Application Priority Data

Dec. 6, 2023 (CN) ........................ 202311663473.5

(51) Int. Cl.
*G06F 16/901* (2019.01)

(52) U.S. Cl.
CPC ................................. *G06F 16/901* (2019.01)

(58) Field of Classification Search
CPC ..... G06F 16/901; H04L 69/04; H04L 1/0006; H04L 1/0016; H04L 1/0078
See application file for complete search history.

(56) References Cited

U.S. PATENT DOCUMENTS

2010/0030796 A1* 2/2010 Netz ................. G06F 16/24561 707/756
2017/0364815 A1* 12/2017 Yoldemir .......... G06F 16/24578
2020/0229206 A1* 7/2020 Badic ................ H04W 28/0226
2022/0021721 A1* 1/2022 Liu ..................... H04L 65/1069
2023/0216922 A1* 7/2023 Ardiri ..................... H04L 47/36 709/223
2023/0305115 A1* 9/2023 Zhou ................... H03M 7/3068
2025/0117392 A1* 4/2025 Schueller ................ G06F 9/541

* cited by examiner

*Primary Examiner* — El Hadji M Sall

(57) ABSTRACT

A data processing method, device and apparatus, and a storage medium are disclosed. The data processing method includes obtaining a data packet including multiple raw data; determining a target data type corresponding to each raw datum in the data packet; determining a target data processing mode corresponding to each raw datum based on a data processing requirement for the data packet and the target data type corresponding to each raw datum in the data packet, the data processing requirement including at least one or more of data compression, data storage and data decoding; and performing data processing on each raw datum based on the target data processing mode corresponding to each raw datum. The method can ensure the integrity of compression of mixed data, reduce the bandwidth and storage space occupied by the transmission of the compressed data packet, and can be implemented in a relatively simple way.

20 Claims, 3 Drawing Sheets

DATA PROCESSING METHOD, DATA PROCESSING DEVICE, DATA PROCESSING APPARATUS, AND STORAGE MEDIUM

CROSS-REFERENCE TO RELATED APPLICATION

This disclosure claims priority to Chinese Patent Application No. 202311663473.5 entitled "DATA PROCESSING METHOD, DATA PROCESSING DEVICE, DATA PROCESSING APPARATUS, AND STORAGE MEDIUM" and filed with the CNIPA on Dec. 6, 2023, the content of which is incorporated herein by reference in its entirety.

FIELD

The disclosure relates to the technical field of data processing, and more specifically, to a data processing method, a data processing device, a data processing apparatus and a storage medium.

BACKGROUND

Currently, when different Intellectual Property (IP) blocks in a System on Chip (SoC) transmit data via a bus, mixed data on the bus is compressed through compression technologies such as ARM-Frame Buffer compression (AFBC), adaptive scalable texture compression (ASTC) or transaction elimination (TE). However, ASTC and TE are lossy compression technologies, so the integrity of the transmitted data cannot be guaranteed when the mixed data is compressed, and the complexity of AFBC to implement data compression is relatively high.

SUMMARY

The present disclosure is intended to resolve at least one of technical problems in the prior art. Therefore, one aim of the present disclosure is to provide a data processing method, which can ensure the integrity of compression of the mixed data, reduce the bandwidth and storage space occupied by transmission of the compressed data packet and can be easy to be achieved.

A second aim of the present disclosure is to provide a data processing device.

A third aim of the present disclosure is to provide a data processing apparatus.

A fourth aim of the present disclosure is to provide a non-transitory computer storage medium.

To solve the above problem, an embodiment of the first aspect of the present disclosure provides a data processing method which includes: obtaining a data packet including multiple raw data; determining a target data type corresponding to each raw datum in the data packet; determining a target data processing mode corresponding to each raw datum based on a data processing requirement for the data packet and the target data type corresponding to each raw datum in the data packet, the data processing requirement including at least one or more of data compression, data storage and data decoding; and performing data processing on each raw datum based on the target data processing mode corresponding to each raw datum.

Based on the data processing method of the embodiment of the present disclosure, a data packet needs to be compressed when an IP code transmits the data packet to another IP code via a bus. In other words, when the data processing requirement for the data packet is data compression, the target data processing mode corresponding to each raw datum is determined based on the target data type of each raw datum in the data packet, that is, the compression processing modes corresponding to raw data of different target data types are determined, and then compression of each raw datum without any loss is performed using the target data processing mode of each raw datum. Therefore, compared with the direct compression of mixed data on the bus through the existing compression technology, the present disclosure classifies each raw datum in the data packet to adopt different lossless compression modes for the raw data of different target data types, so as to ensure the integrity of compression of mixed data, reduce the bandwidth and storage space occupied by the transmission of the compressed data packet. In addition, the method is relatively simple to be implemented.

In some embodiments, the determining the target data type corresponding to each raw datum in the data packet includes: determining the target data type corresponding to each raw datum in the data packet based on preset data types. The preset data types at least include a duplicate data type, a first data type, a second data type and a third data type. The first data type represents a raw datum in the data packet that satisfies a condition that a data difference between a current raw datum to be transmitted and an immediately previous raw datum to be transmitted is less than a preset threshold. The second data type represents a raw datum in the data packet that satisfies a condition that data volume in a single transmission is greater than a preset data volume and numerical values of the raw datum are exhaustible. The third data type represents other raw data in the data packet except for the raw datum conforming to the duplicate data type, the raw datum conforming to the first data type and the raw datum conforming to the second data type.

In some embodiments, the data packet is a data packet to be compressed. The determining the target data processing mode corresponding to each raw datum based on the data processing requirement for the data packet and the target data type corresponding to each raw datum in the data packet includes: determining the target data processing mode to be a first data compression mode if the data processing requirement is data compression and the target data type is the duplicate data type. The first data compression mode is implemented by: extracting a first valid data in a single transmission from the raw datum conforming to the duplicate data type in the data packet, extracting a first total data bit number and a bit width of the first valid data of the raw datum conforming to the duplicate data type, and determining the first total data bit number, the bit width of the first valid data and the valid data in the single transmission to be compressed datum of the raw datum conforming to the duplicate data type.

In some embodiments, the determining the target data processing mode corresponding to each raw datum based on the data processing requirement for the data packet and the target data type corresponding to each raw datum in the data packet includes: determining the target data processing mode to be a second data compression mode if the data processing requirement is data compression and the target data type is the first data type. The second data compression mode is implemented by: obtaining a preset difference bit width; determining, for raw datum that conforms to the first data type and satisfies a condition that the data difference is within a range represented by a preset difference bit width, the data difference to be compressed datum of the raw datum conforming to the first data type; determining, for raw datum that conforms to the first data type and satisfies a condition that the data difference is not within the range represented by the preset difference bit width, the raw datum to be compressed datum of the raw datum conforming to the first data type; and adding a valid identification bit to each compressed data to obtain second valid data after compression of the raw datum conforming to the first data type in the data packet, wherein the valid identification bit distinguishing whether the compressed data is a data difference value.

In some embodiments, the determining the target data processing mode corresponding to each raw datum based on the data processing requirement for the data packet and the target data type corresponding to each raw datum in the data packet includes: determining, if the data processing requirement is data compression and the target data type is the second data type, the target data processing mode to be a third data compression mode. The third data compression mode is implemented by: sequentially storing all exhaustible values of the raw datum conforming to the second data type into an indexed array based on indexed address values; obtaining a target indexed address value of the raw datum conforming to the second data type; and determining the indexed array and the target indexed address value to be compressed datum of the raw datum conforming to the second data type.

In some embodiments, the determining the target data processing mode corresponding to each raw datum based on the data processing requirement for the data packet and the target data type corresponding to each raw datum in the data packet includes: determining, if the data processing requirement is data compression and the target data type is the third data type, the target data processing mode to be a fourth data compression mode. The raw datum in the data packet that conforms to the third data type is not compressed in the fourth data compression mode.

In some embodiments, the method further includes setting, after data compression of the data packet is completed, identification codes for the compressed data packet based on the target data type corresponding to each raw datum in the data packet. The identification codes at least include data type identification code, data packet start identification code, data packet end identification code, data type end identification code, array identification code, and indexed address identification code.

In some embodiments, when the data processing requirement is data storage, the method includes: circularly storing the compressed data packet in a memory in a bus clock cycle, and sequentially storing the compressed data packet in an order of the data packet start identification code, the compressed datum of the raw datum conforming to the duplicate data type, the compressed datum of the raw datum conforming to the first data type, the compressed datum of the raw datum conforming to the second data type, the compressed datum of the raw datum conforming to the third data type, and the data packet end identification code during the data storage.

In some embodiments, the determining the target data processing mode corresponding to each raw datum based on the data processing requirement for the data packet and the target data type corresponding to each raw datum in the data packet includes: determining, if the data processing requirement is data storage and the target data type is the duplicate data type, the target data processing mode to be a first data storage mode. The first data storage mode is implemented by: sequentially storing, when storing compressed datum of the raw datum conforming to the duplicate data type, the data type identification code corresponding to the raw datum conforming to the duplicate data type, a first total data bit number of the raw datum conforming to the duplicate data type, a bit width of a first valid data in a single transmission in the raw datum conforming to the duplicate data type, a first valid data transmitted in a single transmission in the raw datum conforming to the duplicate data type, and the data type end identification code corresponding to the raw datum conforming to the duplicate data type in this order.

In some embodiments, the determining the target data processing mode corresponding to each raw datum based on the data processing requirement for the data packet and the target data type corresponding to each raw datum in the data packet includes: determining, if the data processing requirement is data storage and the target data type is the first data type, the target data processing mode to be a second data storage mode. The second data storage mode is implemented by: sequentially storing, when storing the second valid data obtained after the compression of the raw datum conforming to the first data type in the data packet, the data type identification code corresponding to the raw datum conforming to the first data type, a second total data bit number of the raw datum conforming to the first data type, a preset difference bit width of the raw datum conforming to the first data type, an original data bit width of the raw datum conforming to the first data type, the second valid data, and the data type end identification code corresponding to the raw datum conforming to the first data type in this order.

The second valid data is "valid identification bit+data difference" or "valid identification bit+raw data".

In some embodiments, said determining the target data processing mode corresponding to each raw datum based on the data processing requirement for the data packet and the target data type corresponding to each raw datum in the data packet includes: determining, if the data processing requirement is data storage and the target data type is the second data type, the target data processing mode to be a third data storage mode. The third data storage mode is implemented by: sequentially storing, when storing the compressed datum of the raw datum conforming to the second data type, the data type identification code corresponding to the raw datum conforming to the second data type, the array identification code, a third total data bit number of all the exhaustible values in the indexed array, a bit width of each value in the indexed array, the indexed array, the indexed address identification code, a fourth total data bit number of all indexed address values in the indexed array, a bit width of each indexed address value in the indexed array, the target indexed address value, and the data type end identification code corresponding to the raw datum that conforms to the second data type in this order under a condition that the indexed array needs to be stored.

In some embodiments, said determining the target data processing mode corresponding to each raw datum based on the data processing requirement for the data packet and the target data type corresponding to each raw datum in the data packet includes: determining, if the data processing requirement is data storage and the target data type is the second data type, the target data processing mode to be a third data storage mode. The third data storage mode is implemented by: sequentially storing, when storing the compressed datum of the raw datum that conforms to the second data type, the data type identification code corresponding to the raw datum that conforms to the second data type, a fourth total data bit number of all indexed address values in the indexed array, a bit width of each indexed address value in the indexed array, the target indexed address value, and the data type end identification code corresponding to the raw datum that conforms to the second data type in this order under a condition that the indexed array does not need to be stored.

In some embodiments, the determining the target data processing mode corresponding to each raw datum based on the data processing requirement for the data packet and the target data type corresponding to each raw datum in the data packet includes: determining, if the data processing requirement is data storage and the target data type is a third data type, the target data processing mode to be a fourth data storage mode. The fourth data storage mode is implemented by: sequentially storing, when storing the compressed datum of the raw datum that conforms to the third data type, the data type identification code corresponding to the raw datum that conforms to the third data type, a fifth total data bit number of the raw datum that conforms to the third data type, the raw datum that conforms to the third data type, and the data type end identification code corresponding to the raw datum that conforms to the third data type in this order.

In some embodiments, the data packet is a data packet to be decoded. The determining the target data type corresponding to each raw datum in the data packet includes: obtaining a data type identification code in the data packet; and determining the target data type corresponding to each raw datum based on the data type identification code.

In some embodiments, said determining the target data processing mode corresponding to each raw datum based on the data processing requirement for the data packet and the target data type corresponding to each raw datum in the data packet includes: determining, if the data processing requirement is data decoding and the target data type is duplicate data type, the target data processing mode to be a first data decoding mode. The first data decoding mode is implemented by: obtaining a first total data bit number of the raw datum that conforms to the duplicate data type and a bit width of a first valid data in a single transmission; continuously extracting data based on the bit width of the first valid data, until a bit width accumulated total of each extracted first valid data reaches the first total data bit number; detecting a data type end identification code corresponding to the raw datum that conforms to the duplicate data type; performing data recovery on the raw datum that conforms to the duplicate data type based on the first total data bit number and the bit width of the first valid data.

In some embodiments, said determining the target data processing mode corresponding to each raw datum based on a data processing requirement for the data packet and the target data type corresponding to each raw datum in the data packet includes: determining, if the data processing requirement is data decoding and the target data type is the first data type, the target data processing method to be a second data decoding mode. The second data decoding mode is implemented by: obtaining a second total data bit number of the raw datum that conforms to the first data type, a preset difference bit width, and an original data bit width; performing a first extraction step to extract an valid identification bit and extract the raw datum corresponding to the valid identification bit based on the valid identification bit; performing cyclically the first extraction step until a bit width accumulated total of each compressed data that is extracted reaches the second total data bit number; detecting a data type end identification code corresponding to the raw datum that conforms to the first data type; and performing data recovery on the raw datum corresponding to the valid identification bit based on the valid identification bit.

In some embodiments, said performing data recovery on compressed data corresponding to the valid identification bit based on the valid identification bit includes: adding, in response to determining the raw datum corresponding to the valid identification bit to be a data difference value based on the valid identification bit, the data difference value to an immediately previous recovered datum to obtain recovered datum of the raw datum corresponding to the valid identification bit, wherein the immediately previous recovered datum is recovered datum corresponding to an immediately previous raw datum that conforms to the first data type; and giving up data processing in response to determining the raw datum corresponding to the valid identification bit to be the raw datum based on the valid identification bit.

In some embodiments, the determining the target data processing mode corresponding to each raw datum based on the data processing requirement for the data packet and the target data type corresponding to each raw datum in the data packet includes: determining, if the data processing requirement is data decoding and the target data type is the second data type, the target data processing mode to be a third data decoding mode. The third data decoding mode is implemented by: sequentially extracting, under the condition that an array identification code is detected, a third total data bit number of all exhaustible values in the indexed array, a bit width of each value in the indexed array, and the indexed array; extracting, under the condition that an indexed address identification code is detected, a fourth total data bit number of all indexed address values in the indexed array and a bit width of each indexed address value in the indexed array; cyclically extracting the target indexed address value until a bit width accumulated total of each extracted target indexed address value reaches the fourth total data bit number; detecting the data type end identification code corresponding to the raw datum that conforms to the second data type; and searching and mapping the indexed array based on the target indexed address value to obtain recovered datum corresponding to the raw datum that conforms to the second data type.

In some embodiments, said determining the target data processing mode corresponding to each raw datum based on the data processing requirement for the data packet and the target data type corresponding to each raw datum in the data packet includes: determining, if the data processing requirement is data decoding and the target data type is the second data type, the target data processing mode to be a third data decoding mode. The third data decoding mode is implemented by: extracting a fourth total data bit number of all indexed address values in the indexed array and a bit width of each indexed address value in the indexed array under the condition that an array identification code is not detected and an indexed address identification code is detected; cyclically extracting the target indexed address value until a bit width accumulated total of each extracted target indexed address value reaches the fourth total data bit number; detecting a data type end identification code corresponding to the raw datum that conforms to the second data type; searching and mapping the indexed array based on the target indexed address value to obtain recovered datum corresponding to the raw datum that conforms to the second data type.

In some embodiments, the determining the target data processing mode corresponding to each raw datum based on the data processing requirement for the data packet and the target data type corresponding to each raw datum in the data packet includes: determining, if the data processing requirement is data decoding and the target data type is the third data type, the target data processing mode to be a fourth data decoding mode. The fourth data decoding mode is implemented by: extracting a fifth total data bit number of the raw datum that conforms to the third data type, and extracting the raw datum based on the fifth total data bit number; detecting a data type end identification code corresponding to the raw datum that conforms to the third data type; and determining all extracted raw data as recovered data corresponding to the raw data that conform to the third data type.

An embodiment in a second aspect of the present disclosure provides a data processing device, including: an obtaining module configured to obtain a data packet including multiple raw data; a first determination module configured to determine a target data type corresponding to each raw datum in the data packet; a second determination module configured to determine a target data processing mode corresponding to each raw datum based on a data processing requirement for the data packet and the target data type corresponding to each raw datum in the data packet, the data processing requirement including at least one or more of data compression, data storage, and data decoding; and a processing module configured to perform data processing on each raw datum based on the target data processing mode corresponding to each raw datum.

The data processing device according to the embodiment of the present disclosure can ensure the integrity of compression of the mixed data, reduce the bandwidth and storage space occupied by transmission of the compressed data packet, and can be implemented in a relatively simple way.

An embodiment in a third aspect of the present disclosure provides a data processing apparatus which includes at least one processor and a memory in communication connection with the at least one processor. The memory stores a computer program executable by the at least one processor, and the computer program when executed by the at least one processor implements the data processing method in any of the embodiments.

The data processing apparatus of the embodiment of the present disclosure, can ensure the integrity of compression of the mixed data, reduce the bit width and storage space occupied by transmission of the compressed data packet and can be implemented in a relatively simple way.

An embodiment in a fourth aspect of the present disclosure provides a non-transitory computer storage medium on which a computer program is stored. The computer program, when executed by a processor, implements the data processing method in any of the embodiments.

Additional aspects and advantages of the disclosure will be given in part in the following descriptions, become apparent in part from the following descriptions, or be learned from the practice of the disclosure.

BRIEF DESCRIPTION OF THE DRAWINGS

The above and/or additional aspects and advantages of the present disclosure will become apparent and readily comprehensible from the description of the embodiments in conjunction with the following drawings.

REFERENCE NUMERALS

Figure 1:
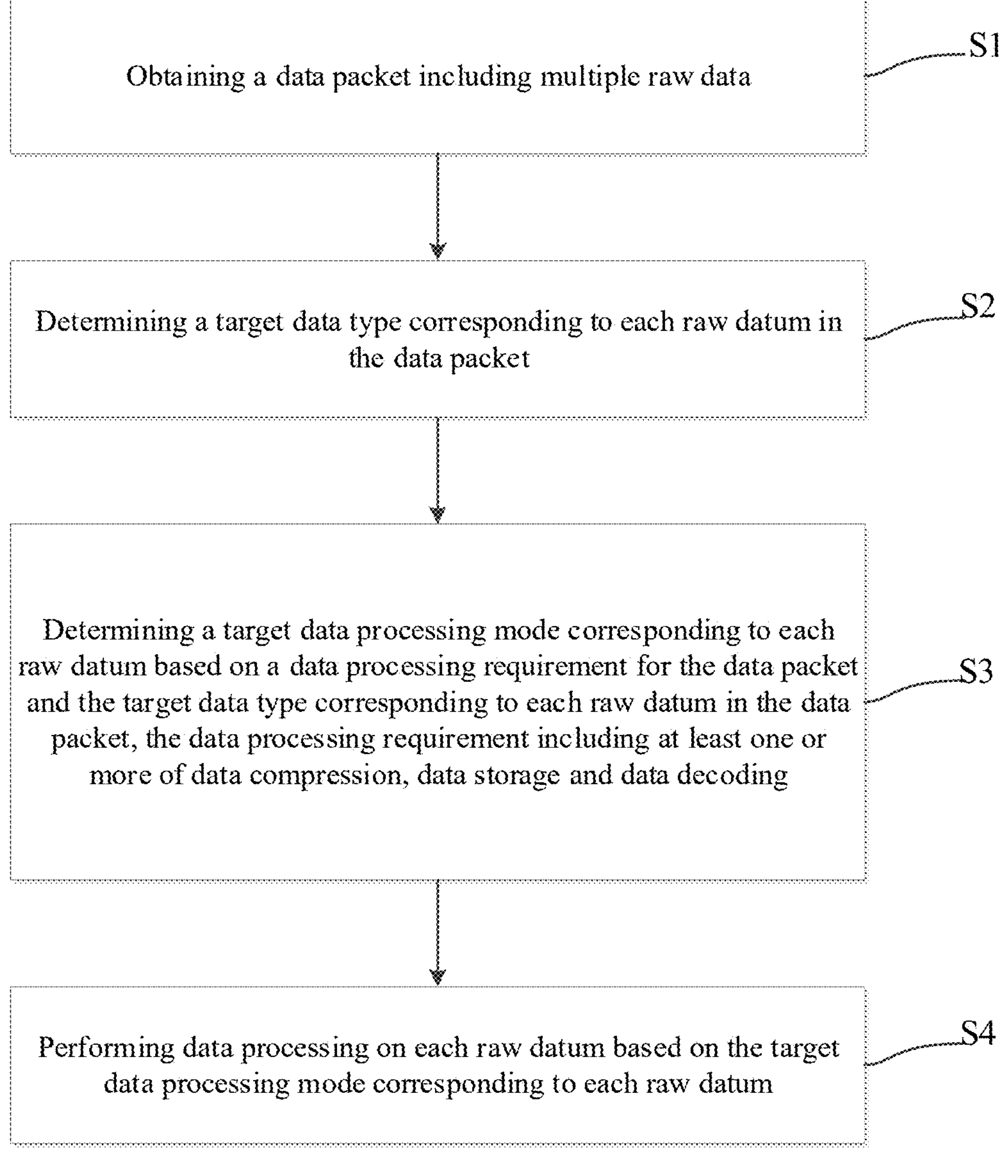
FIG. 1 is a flow chart of a data processing method according to an embodiment of the present disclosure.

Data processing device 10; Data processing apparatus 20; Obtaining module 1; First determination module 2; Second determination module 3; Processing module 4; Processor 5; Memory 6.

DETAILED DESCRIPTION

Embodiments of the present disclosure will be described below in details, and the embodiments described with reference to drawings are exemplary. Embodiments of the present disclosure will be described below in details.

To solve the above problem, an embodiment in a first aspect of the present disclosure provides a data processing method. With this method, it can ensure the integrity of the mixed data compression, reduce a bit width and storage space occupied by transmission of a compressed data packet. The implementation of the method is relatively simple.

A data processing method according to an embodiment of the present disclosure is described below with reference to FIG. 1. As shown in FIG. 1, the method at least includes steps S1 to S3.

At step S1, a data packet including multiple raw data is obtained.

For example, an IP block reads a data packet from a bus. The data packet includes mixed data.

At step 2, a target data type corresponding to each raw datum in the data packet is determined.

For example, a data type identifier is set in each raw datum in the data packet, therefore the target data type corresponding to each raw datum in the data packet is determined by the data type identifier.

At step 3, a target data processing mode corresponding to each raw datum is determined based on a data processing requirement for the data packet and the target data type corresponding to each raw datum in the data packet. The data processing requirement includes at least one or more of data compression, data storage, and data decoding.

Specifically, three steps of data compression, data storage, and data decoding are mainly included in a data transmission process via different IP cores. An IP core, when transmitting a data packet to another IP core, compresses the data packet to reduce the size of the data packet. After receiving the compressed data packet, the other IP core stores the data packet for later recovery of the compressed data packet and decodes (i.e., uncompresses) the compressed data packet to recover the data packet. decoding is a reverse process of the compression. Therefore, the data processing requirement at least includes data compression, data storage, and data decoding. Different data processing requirements and different target data types correspond to different data processing modes. Based on this, a target data processing mode corresponding to each raw datum is determined based on a data processing requirement for the data packet and the target data type corresponding to each raw datum in the data packet. In other words, if the data processing requirement is determined as data compression on the data packet and the target data type of each raw datum in the data packet is determined, then the target data processing mode corresponding to each raw datum is determined based on the target data type of each raw datum, here the target data processing mode is a mode of data compression of each raw datum and the raw data of different target data types correspond to different data compression modes. If the data processing requirement is determined as data storage of the data packet and the target data type of each raw datum in the data packet is determined, then the target data processing mode corresponding to each raw datum is determined based on the target data type of each raw datum, here the target data processing mode is a mode of data storage of each raw datum and the raw data of different target data types correspond to different data storage modes. If the data processing requirement is determined as data decoding of the data packet and the target data type of each raw datum in the data packet is determined, then the target data processing mode corresponding to each raw datum is determined based on the target data type of each raw datum, here the target data processing mode is a mode of data decoding of each raw datum and the raw data of different target data types correspond to different data decoding modes. Therefore, the target data processing mode corresponding to each raw datum is determined based on the data processing requirement and the target data type of each raw datum.

At step S4, data processing is performed on each raw datum based on the target data processing mode corresponding to each raw datum.

Specifically, at present, mixed data on a bus is directly compressed through the existing compression technologies such as ARM, ASTC or TE, so that the integrity of the transmitted data cannot be guaranteed when the mixed data on the bus is compressed. To solve the problem, in the present disclosure, when the data processing requirement for a data packet is data compression, a target data processing mode corresponding to each raw datum is determined based on the target data type of each raw datum in the data packet. The target data processing mode is a mode of compressing each raw datum and the raw data of different target data types correspond to different data compression modes. Finally, each raw datum is compressed without any loss through the target data processing mode corresponding to each raw datum to eliminate the redundant data of each raw datum. Therefore, compared with direct compression of mixed data on the bus through existing compression technology, the present disclosure classifies each raw datum in the data packet to adopt different lossless compression modes for the raw data of different target data types, so as to ensure the integrity of mixed data compression, reduce the bandwidth and storage space occupied by the transmission of the compressed data packet, and also reduce the power consumption of the IP core. In addition, the implementation method is relatively simple.

After receiving the compressed data packet, the other IP core performs data storage based on the target data type of each raw datum in the data packet so as to recover the compressed data packet later. Specifically, the target data processing mode corresponding to each raw datum is determined based on the target data type of each raw datum in the data packet. Here, the target data processing mode is a mode of performing data storage on each raw datum and the raw data of different target data types correspond to different data storage modes. After storing the compressed data packet, the IP core reads the compressed data packet and decodes the compressed data packet. Specifically, the target data processing mode corresponding to each raw datum is determined based on the target data type of each raw datum. Here, the target data processing mode is a mode of performing data decoding on each raw datum. Then, the other IP core decodes each raw datum based on the target data processing mode corresponding to each raw datum to obtain the data packet before compression. Therefore, decompression of the compressed data packet is achieved.

Based on the data processing method of the embodiment of the present disclosure, a data packet needs to be compressed when an IP code transmits the data packet to another IP code via a bus. In other words, when the data processing requirement for the data packet is data compression, the target data processing mode corresponding to each raw datum is determined based on the target data type of each raw datum in the data packet, that is, the compression processing modes corresponding to raw data of different target data types are determined, and then compression of each raw datum without any loss is performed using the target data processing mode of each raw datum. Therefore, compared with the direct compression of mixed data on the bus through the existing compression technology, the present disclosure classifies each raw datum in the data packet to adopt different lossless compression modes for the raw data of different target data types, so as to ensure the integrity of compression of mixed data, reduce the bandwidth and storage space occupied by the transmission of the compressed data packet. In addition, the method is relatively simple to be implemented.

In some embodiments, the determining the target data type corresponding to each raw datum in the data packet includes determining the target data type corresponding to each raw datum in the data packet based on preset data types. The preset data types at least include a duplicate data type, a first data type, a second data type and a third data type. The duplicate data type represents data that is subject to multiple charging. The first data type represents a raw datum in the data packet that satisfies a condition that a data difference between a current raw datum to be transmitted and an immediately previous raw datum to be transmitted is less than a preset threshold. The second data type represents a raw datum in the data packet that satisfies a condition that data volume in a single transmission is greater than a preset data volume and numerical values of the raw datum are exhaustible. The third data type represents other raw data in the data packet except for the raw datum conforming to the duplicate data type, the raw datum conforming to the first data type and the raw datum conforming to the second data type. Therefore, after the data packet is obtained, each raw datum in the data package is classified based on the preset data type to determine the target data type corresponding to each raw datum in the data packet. The target data type corresponding to each raw datum can be the duplicate data type, the first data type, the second data type, or the third data type. In addition, each raw datum can be classified based on the data characteristics of each raw datum.

In some embodiments, the data packet is a data packet to be compressed. The target data processing mode corresponding to each raw datum is determined based on the data processing requirement for the data packet and the target data type corresponding to each raw datum in the data packet. Specifically, different data processing requirements and different target data types correspond to different data processing modes. If the data processing requirement is data compression and the target data type is the duplicate data type, that is, if the data packet needs to be compressed when being transmitted and the target data type of each raw datum in the data packet is determined as the duplicate data type, then the target data processing mode corresponding to the raw datum is determined to be a first data compression mode, and the raw datum is compressed through the first data compression mode to obtain the compressed datum of the raw datum conforming to the duplicate data type. Therefore, compressing the raw datum of the duplicate data type through the first data compression mode can effectively reduce the transmission data volume and ensure the integrity of the compressed data packet.

In an embodiment, the first data compression mode is implemented by extracting a first valid data in a single transmission from the raw datum conforming to the duplicate data type in the data packet, extracting a first total data bit number and a bit width of the first valid data of the raw datum conforming to the duplicate data type, and determining the first total data bit number, the bit width of the first valid data and the valid data in the single transmission to be compressed datum of the raw datum conforming to the duplicate data type. Therefore, compressing the raw datum of the duplicate data type into the valid data in a single transmission through the first data compression mode can effectively reduce the amount of the transmitted data and ensure the integrity of the compressed data package at the same time.

For example, multiple raw data in the data packet are pux, puy, puh, puw, predW, predH, mvx, mvy and other data. Each of pux, puy, puh and puw has a bit width of 10 bits. If the target data type of the raw data pux, puy, puh and puw is the duplicate data type, since the raw data pux, puy, puh and puw will be transmitted for multiple times, a first valid data in a single transmission of the four raw data are extracted, that is, the first valid data are pux, puy, puh and puw respectively, and a first total data bit number of the raw data of the duplicate data type in the data packet is extracted. That is, a total bit number and a bit width of the first valid data are extracted. Here, the bit width of the first valid data is 4*10 bits. The first total data bit number, the bit width of the first valid data and the valid data in a single transmission (that is, the first valid data) are taken as the data obtained after the raw datum conforming to the duplicate data type in the data package being compressed using the first data compression mode. The to-be-transmitted first total data bit number of the compressed data is 40 bits, and the compressed data include pux, puy, puh, puw and the compression parameters of the duplicate data type. The compression parameters are the first total data bit number and the bit width of the first valid data. Therefore, the compression processing on the raw data of the duplicate data type (that is, the raw data that is transmitted repeatedly) is achieved.

In addition, the data packet contains all valid data that need to be compressed and transmitted later.

In some embodiments, the target data processing mode corresponding to each raw datum is determined based on the data processing requirement for the data packet and the target data type corresponding to each raw datum in the data packet. Specifically, different data processing requirements and different target data types correspond to different data processing modes. If the data processing requirement is data compression and the target data type is the first data type, that is, if the data packet is needed to be compressed when being transmitted and it determines that the target data type of each raw datum in the data packet is a first data type, it determines that the target data processing mode corresponding to the raw datum is a second data compression mode, Then the raw datum is compressed using the second data compression mode to obtain a second valid data after compression of the raw datum conforming to the first data type in the data packet. Therefore, the compression processing of the raw datum of the first data type through the second data compression mode can effectively reduce the amount of data transmitted and ensure the integrity of the compressed data package.

In the embodiment, the second data compression mode includes obtaining a preset difference bit width. The preset difference bit width is set for the purpose of reducing data volume of transmitted data. Based on the probability statistics method, the setting of preset difference bit width shall ensure that most of data differences can fall into the preset difference bit width to ensure the integrity of the transmitted data. A data difference between the current raw datum of the first data type and the same raw datum of the first data type transmitted last time is calculated. For raw datum that conforms to the first data type and satisfies a condition that the data difference is within a representing range of the preset difference bit width, that is, if the difference between the raw datum of the current first data type and the same raw datum of the first data type transmitted last time is within the data representation range of the preset difference bit width that is represented in binary, then it indicates that the difference between the raw datum and the same raw datum transmitted last time is small. At this time, transmission of the data difference can greatly reduce the transmission data volume, thus the data difference is taken as the compressed datum of the raw datum conforming to the first data type. For raw datum that conforms to the first data type and satisfies a condition that the data difference is not within the representing range of the preset difference bit width, that is, if the data difference between the current raw datum of the first data type and the raw datum of the first data type transmitted last time is not within the data representing range of the preset difference bit width in binary, it indicates that the data difference between the raw datum and the same raw datum transmitted last time is relatively large and the data volume of the data difference is larger than that of the raw datum. At this time, transmission of the data difference can increase the data volume of transmission, therefore the raw datum is taken as the compressed datum of the raw datum conforming to the first data type and a valid identification bit is added to each compressed datum. The valid identification bit is used to indicate whether the compressed datum is the data difference so as to obtain second valid data obtained by compression of the raw datum conforming to the first data type in the data packet. Therefore, the compression of the raw datum of the first data type is performed by the second data compression mode, that is the data difference is transmitted when the difference between the current raw datum and the previous raw datum is small. In this way, it can effectively reduce the data volume of transmission and ensure the integrity of the compressed data packet.

For example, multiple raw data in the data packet are pux, puy, puh, puw, predW, predH, mvx, mvy and other data. The target data type of mvx and mvy is the first data type. The target data type of other data is the third data type. Assuming that each of the raw data mvx and mvy has a bit width of 20 bits, and the preset difference bit width has a value of 5 bits, and the range of preset difference bit width expressed in binary data is [−16,+15]. Then a data difference between the current mvx and the immediately previous mvx in the data packet is calculated, as well as a data difference between the current mvy and the immediately previous mvy in the data packet is calculated. If the data difference corresponding to mvx or mvy is within the range of the preset difference bit width that is represented in binary data, the data difference corresponding to the raw datum mvx can be converted into the binary form of 5 bits for transmission, that is, the data difference can be used as the compressed datum of the raw datum conforming to the first data type, and a valid identification bit shall be added to the compressed data, here the valid identification bit is of 1 bit. In addition, the data difference corresponding to the raw datum mvy can be converted into the binary form of 5 bits. If the data difference corresponding to mvx or mvy is not within the representing range of the preset difference bit width, the current raw datum mvx or mvy is directly transmitted, that is, the raw datum is taken as the compressed datum of the raw datum conforming to the first data type and a valid identification bit is added to the compressed data to obtain compression parameters of the first data type. The compressed data includes the compression parameters of the first data type and the valid identification bit, mvx data difference mvdx (or the raw datum mvx), mvy data difference mvdy (or the raw datum mvy). Therefore, the compression processing of the raw datum of the first data type is obtained by the second data compression mode.

It is assumed that each of the differences calculated for these two mvs in the data packet falls within the range of [−16,+15] in a proportion of 50%, the total number of data bits to be transmitted after compression of the two data mvs in the data packet is 27000 bits. The range of preset difference bit width expressed in binary data is [−2^(w1−1), 2^(w1−1)−1], where w1 is the preset difference bit width.

In addition, second valid data is obtained after compressing the raw datum conforming to the first data type in the data packet. When transmitting the second valid data, if the preset difference bit width is w1, the bit width of the valid identification bit is w2 and the bit width of the raw datum is w3, then the bit width of the corresponding second valid data in the case in which the data difference is transmitted as the compressed data is w1+w2, and the bit width of the second valid data when the raw datum of the first data type is transmitted as compressed data is w3+w2.

In addition, if the second total data bit number of the first data type in the data packet is N2, and the proportion of data difference falling within the range of w1 is 50%, then the total data bit number of compression is (w2+0.5w3+0.5w1) N2/w3.

In some embodiments, the target data processing mode corresponding to each raw datum is determined based on the data processing requirement for the data packet and the target data type corresponding to each raw datum in the data packet. Specifically, different data processing requirements and different the target data types correspond to different data processing modes. If the data processing requirement is data compression and the target data type is the second data type, that is, if the data packet is needed to be compressed when being transmitted and it is determined that the target data type of each raw datum in the data packet is the second data type, it is determined that the target data processing mode is a third data compression mode. Then the raw datum is compressed through the third data compression mode to obtain the compressed datum of the raw datum conforming to the second data type. Therefore, the raw data of the second data type is compressed by the second data compression mode into an indexed array and a target indexed address value. Therefore, it can effectively reduce the amount of data transmitted and ensure the integrity of the compressed data packet.

In an embodiment, the third data compression mode is implemented by sequentially storing all exhaustible values of the raw datum conforming to the second data type into an indexed array based on indexed address values (that is, the raw datum of the second data type has a limited number of different values, and each exhaustible value of the raw datum conforming to the second data type corresponds to an indexed address value in the indexed array), obtaining the target indexed address value of the raw datum conforming to the second data type (that is, taking all the indexed address values corresponding to each exhaustible value of the raw datum conforming to the second data type as the target indexed address value), and determining the indexed array and the target indexed address value to be compressed datum of the raw datum conforming to the second data type (that is, converting the raw datum conforming to the second data type into an indexed array and a target indexed address value as compressed data). Therefore, the third data compression mode can effectively reduce the amount of data and ensure the integrity of the raw datum of the second data type.

For example, the multiple raw data in the data packet are pux, puy, puh, puw, predW, predH, mvx, mvy, and other data. The target data type of predW and predH is the second data type. It is assumed that each of the raw data predH and predW has a bit width of 8 bits, the exhaustible values of predH and predW are fixed as one of the eight values of {0, 1, 2, 4, 8, 16, 32, 64} based on the AV1 standard spec. These eight values are stored in the indexed array MAP, and the indexed address value corresponding to each exhaustible value of predH and predW has a bit width of 3 bits. Finally, the indexed array and the target indexed address value are taken as the compressed datum of the raw datum conforming to the second data type. Since the indexed array MAP contains eight values, each of which has a bit width of 6 bits, and the indexed address value has a transmission bit width of 3 bits, the total bit number of data to be transmitted after compression of the raw data of the second data type in the packet has a value of 6048 bits, and the compressed data is determined as the indexed addresses corresponding to predW and predH and the compression parameters of the second data type.

In some embodiments, the target data processing mode corresponding to each raw datum is determined based on the data processing requirement for the data packet and the target data type corresponding to each raw datum in the data packet. Specifically, different data processing requirements and different target data types correspond to different data processing modes. If the data processing requirement is data compression and the target data type is the third data type, that is if the data packet is needed to be compressed when being transmitted and it is determined that the target data type of each raw datum in the data packet is the third data type which represents other raw data in the data packet except for the raw datum conforming to the duplicate data type, the raw datum conforming to the first data type and the raw datum conforming to the second data type, it is determined that the target data processing mode is a fourth data compression mode. The raw datum in the data packet that conforms to the third data type is not compressed in the fourth data compression mode. This is because the data volume of the raw data of the third data type in the data package is relatively small and the number of data types is relatively large, thus the compression of the raw datum conforming to the third data type cannot effectively reduce the data volume of the raw data, but will increase the complexity and time of compression processing. Therefore, the raw datum conforming to the third data type in the data package is not compressed, thus reducing the complexity of compression processing. In addition, data obtained after compressing the raw data of the third data type by the fourth data compression mode is the raw data of the third data type.

In an embodiment, after compression of the data packet, the compressed data includes data obtained by compression of raw datum of the duplicate data type, the second valid data obtained by compression of the raw datum conforming to the first data type, data obtained by compression of the raw datum conforming to the second data type, and one or more data in the data obtained by compression of the raw datum conforming to the third data type.

Figure 2:
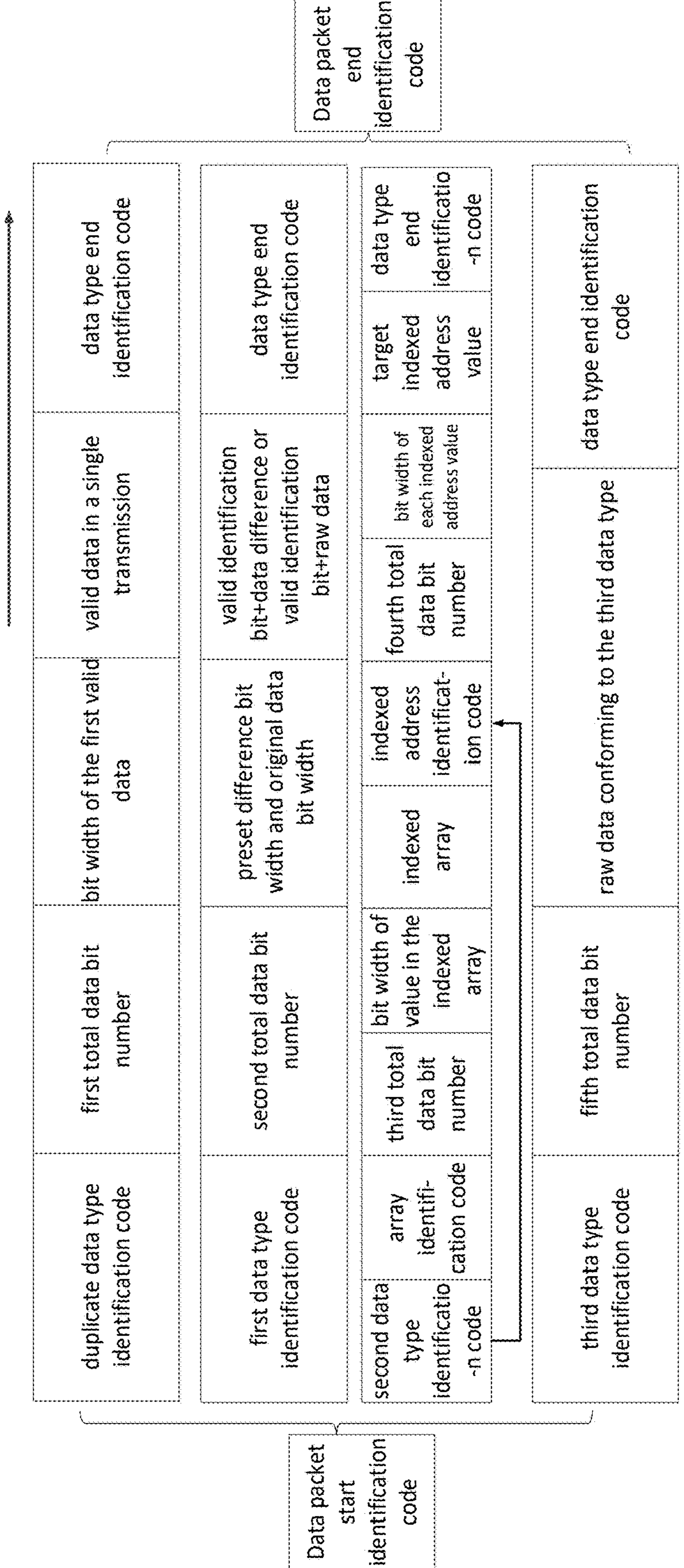
FIG. 2 is a schematic diagram of a data processing method according to an embodiment of the present disclosure.

In some embodiments, after data compression of the data packet, identification codes for the compressed data packet are set based on the target data type corresponding to each raw datum in the data packet. The identification codes at least include data type identification code, data packet start identification code, data packet end identification code, data type end identification code, array identification code, and indexed address identification code. As shown in FIG. 2, the data type identification code can be a duplicate data type identification code, a first data type identification code, a second data identification code, and a third data type identification code to describe the data type of the raw data. The data type end identification code is a duplicate data type identification code, a first data type end identification code, a second data type end identification code, or a third data type end identification code. The packet starts identification code and the packet end identification code represent the start and end of the data packet respectively. The array identification code and the indexed address identification code represent that transmission of the indexed array and the target indexed address value is started when the raw datum of the second data type is transmitted. The data type end identification code represents the end of transmission of all valid data of a certain data type. In addition, the data type identification code has a bit width of 10 bits, the data packet start identification code and the data packet end identification code both have a bit width of 10 bits, the array identification code and the indexed address identification code both have a bit width of 8 bits. Therefore, identification codes are set for the compressed data packet so as to achieve storage and analysis of the compressed data packet.

In an embodiment, when an IP core transfers compressed data to another IP core by a bus, the other IP core obtains the compressed data from the bus. The bus can be an Advanced extensible Interface (AXI) bus. Since the AXI bus is always in burst transmission and one interaction will transmit a large number of data packets, therefore the data packets are stored in the storage of the other IP core in advance to prevent loss of data packets. In addition, the AXI bus has a bus bit width of 128 bits. Therefore, data transmission of 128 bits is taken as a bus clock cycle.

In some embodiments, the compressed data of a data packet and the above-mentioned identification codes are stored in the memory in a bus bit width. That is, when an IP core interact with another IP core by a bus, it concatenates the compressed data of the data packet into data of a bit width conforming to a bus protocol and sends the data to the bus, and one read-write operation of data of a bus bit width (that is, the number of bits of data being transmitted by the bus) can be completed in one bus clock cycle. When the packet is stored in the memory of the other IP core through the bus, multiple bus clock cycles are required to complete the writing of all compressed data of the packet. Based on this, when the data processing requirement is data storage, i.e., when a compressed data packet obtained by compressing a data packet is stored, the compressed data packet is stored circularly in a memory in a bus clock cycle (that is the compressed data packet is read and written, in the bus bit width, into the memory in each bus clock cycle). When data storage is performed, the compressed data packet is stored sequentially in an order of the data packet start identification code, the compressed datum of the raw datum conforming to the duplicate data type, the compressed datum of the raw datum conforming to the first data type, the compressed datum of the raw datum conforming to the second data type, the compressed datum of the raw datum conforming to the third data type, and the data packet end identification code during the data storage. Therefore, the storage of the compressed data packet is completed.

For example, when the data storage is performed on the compressed data packet, as shown in FIG. 2, the data packet start identification code is first stored, the remaining memory space of the memory for the current bus clock cycle is filled with 0, and then the compressed data packet is stored into the memory in an order of the duplicate data type, the first data type, the second data type, and the third data type. Each data type is stored circularly in a bus clock cycle. The data type start identification code, the compressed datum of the raw datum conforming to the corresponding data type and the data type end identification code are stored in this order. After storage of the compressed data of the raw data of all data types is completed, the remaining storage space of the memory for the current bus clock cycle is filled with 0. The data packet end identification code is stored in the final bus clock cycle and the remaining storage space of the memory for the final bus clock cycle is filled with 0. Therefore, the storage of the data packet is finished.

In an embodiment, it is assumed that the data packet includes nine raw data, i.e., pux, puy, puh, puw, predW, predH, mvx, mvy, and other data. When the nine data is obtained from the data packet, these nine raw data are obtained synchronously from an interface at a bit width of 176 bits in each bus clock cycle. A total of 1000 clock cycles is required to read all the raw data in the data packet. Each of the raw data pux, puy, puh, and puw has a bit width of 10 bits, each of the raw data predW and predH has a bit width of 8 bits, each of the raw data mvx and mvy has a bit width of 20 bits, and the other data have a bit width of 80 bits. Therefore, the total number of bits in the data packet that are needed to be transmitted is 1000*(4*10+2*8+2*20+80)=176000. When these bits in the total number are directly transmitted through the 128-bits AXI bus, 176000/128=1375 cycles are required.

In some embodiments, the target data processing mode corresponding to each raw datum is determined based on the data processing requirement for the data packet and the target data type corresponding to each raw datum in the data packet. Specifically, different target data types correspond to different data storage modes. If the data processing requirement is data storage and the target data type is the duplicate data type, that is, if it is determined, when a compressed data packet obtained by compression of a data packet is stored, that the target data type is the duplicate type, the target data processing mode is determined to be a first data storage mode. Then the compressed datum of the raw datum conforming to the duplicate data type is stored based on the first data storage mode. Therefore, the storage of the raw datum of the duplicate data type is achieved through the first data storage mode.

When the compressed datum of the raw datum conforming to the duplicate data type is stored based on the first data storage mode, the compressed data packet is stored in the direction indicated by the arrow in FIG. 2. That is, the data type identification code corresponding to the raw datum conforming to the duplicate data type, a first total data bit number of the raw datum conforming to the duplicate data type, a bit width of a first valid data in a single transmission in the raw datum conforming to the duplicate data type, a first valid data transmitted in a single transmission in the raw datum conforming to the duplicate data type, and the data type end identification code corresponding to the raw datum conforming to the duplicate data type are stored sequentially in this order. The first valid data can be the raw data pux, puy, puh and puw.

In some embodiments, the target data processing mode corresponding to each raw datum is determined based on the data processing requirement for the data packet and the target data type corresponding to each raw datum in the data packet. Specifically, different target data types correspond to different data storage modes. If the data processing requirement is data storage and the target data type is the first data type, that is, if it is determined, when a compressed data packet obtained by compressing a data packet is stored, that the target data type is the first data type, the target data processing mode is determined to be a second data storage mode. Then the compressed datum of the raw datum conforming to the first data type is stored based on the second data storage mode. Therefore, the storage of the raw datum of the first data type is achieved through the second data storage mode.

The second data storage mode is implemented by sequentially storing, when storing the second valid data obtained after the compression of the raw datum conforming to the first data type in the data packet, compressed data in the order shown in FIG. 2. The data type identification code corresponding to the raw datum conforming to the first data type, a second total data bit number of the raw datum conforming to the first data type, a preset difference bit width of the raw datum conforming to the first data type, an original data bit width of the raw datum conforming to the first data type, the second valid data, and the data type end identification code corresponding to the raw datum conforming to the first data type are sequentially stored in this order. The second valid data is "valid identification bit+data difference" or "valid identification bit+raw data".

In addition, compression parameters of the first data type are the second total data bit number, the preset difference bit width and the original data bit width.

In an embodiment, all valid identification bits and difference data are stored in groups.

In some embodiments, the target data processing mode corresponding to each raw datum is determined based on the data processing requirement for the data packet and the target data type corresponding to each raw datum in the data packet. Specifically, different data processing requirements and different target data types have different data processing modes. If the data processing requirement is data storage and the target data type is the second data type, that is, if it is determined that, when a compressed data packet obtained by compressing a data packet is stored, that the target data type is the second data type, the target data processing mode is determined to be a third data storage mode. Then the compressed datum of the raw datum conforming to the second data type is stored based on the third data storage mode. Therefore, the storage of the raw datum to the second data type is achieved by the third data storage mode.

In an embodiment, the third data storage mode is implemented by sequentially storing, when storing the compressed datum of the raw datum conforming to the second data type, the compressed data in the order as shown in FIG. 2 under a condition that the indexed array needs to be stored. That is, the data type identification code corresponding to the raw datum conforming to the second data type, the array identification code, a third total data bit number of all the exhaustible values in the indexed array, a bit width of each value in the indexed array, the indexed array, the indexed address identification code, a fourth total data bit number of all indexed address values in the indexed array, a bit width of each indexed address value in the indexed array, the target indexed address value, and the data type end identification code corresponding to the raw datum that conforms to the second data type are sequentially stored in this order.

In an embodiment, the third data storage mode is implemented by sequentially storing, when storing the compressed datum of the raw datum that conforms to the second data type, the data type identification code corresponding to the raw datum that conforms to the second data type, a fourth total data bit number of all indexed address values in the indexed array, a bit width of each indexed address value in the indexed array, the target indexed address value, and the data type end identification code corresponding to the raw datum that conforms to the second data type in this order under a condition that the indexed array does not need to be stored.

In addition, compression parameters of the second data type are the third total data bit number, the bit width of each value in the indexed array, the fourth total data bit number, and the bit width of each indexed address in the indexed array.

The fourth total data bit number=bit width of each value in the indexed array m2*third total data bit number N3/bit width m of each value in the indexed array.

In some embodiments, the target data processing mode corresponding to each raw datum is determined based on the data processing requirement for the data packet and the target data type corresponding to each raw datum in the data packet. Specifically, different data processing requirements and different target data types correspond to different data processing modes. If the data processing requirement is data storage and the target data type is the third data type, that is, it is determined, when a compressed data packet obtained by compressing a data packet is stored, that the target data type is the third data type, then the target data processing mode is determined to be a fourth data storage mode. The compressed datum of the raw datum conforming to the third data type is stored based on the fourth data storage mode. The fourth data storage mode is implemented by sequentially storing, when storing the compressed datum of the raw datum that conforms to the third data type, storing compressed data in the order as shown in FIG. 2. That is, the data type identification code corresponding to the raw datum that conforms to the third data type, a fifth total data bit number of the raw datum that conforms to the third data type, the raw datum that conforms to the third data type, and the data type end identification code corresponding to the raw datum that conforms to the third data type are sequentially stored in this order. Therefore, the storage of the raw datum of the third data type is achieved by the fourth data storage mode.

In addition, the compression parameter of the third data type is a fifth total data bit number.

It is assumed that the total data bit number (i.e., the total bit number) occupied by all the identification codes is L. All the compression parameters including the first total data bit number of the raw datum conforming to the duplicate data type, the bit width of the first valid data, the second total data bit number of the raw datum conforming to the first data type in the data packet, the preset difference bit width of the raw datum conforming to the first data type in the data packet, the raw datum bit width of the raw datum conforming to the first data type in the data packet, the bit width of each value in the indexed array, the forth total data of all the indexed address value in the indexed array, the bit width of each indexed address value in the indexed array the fifth total data bit number of the raw datum conforming to the third data type occupies a total data bit number of L1 for storage. It is assumed that the first total data bit number of the raw datum conforming to the duplicate data type in the data packet is N1, the second total data bit number of the raw datum conforming to the first data type in the data packet is N2, the third total data bit number of the raw datum conforming to the second data type in the data packet is N3, and the fifth total data bit number of the raw datum conforming to the third data type in the data packet is N4, then the total data bit number of the data packet before compression is N1+N2+N3+N4. The total data bit number of the compressed data packet that is the total bit number of data is L+L1+N1+(w2+0.5w3+0.5w1)*N2/w3+m1+m2*N3/m+N4. Here, m1 is the fourth total data bit number of all the indexed address value in the indexed array, m2 is the bit width of each indexed address value in the indexed array, and m is a bit width of each value in the indexed array, that is m2=ceil (log 2 (m1/m)).

In an embodiment, the compressed data packet, that is, the compressed data, compression parameters and the above identification codes, is written into the memory in the form of 128 bits of the AXI bus. When the data packet is stored, each full 128 bits of storage space is called one bus clock cycle.

The data packet start identification code is first stored, and the remaining memory space for the current bus clock cycle is filled with 0, thus the storage of the first total clock cycle is finished. Then, writing of raw data of four data types is started. From the second bus clock cycle, one of the four data type identification codes is written in there are raw data of the four data types in the data packet, the duplicate data type, the first data type, the second data type and the third data type is written into a memory in this order.

If It is determined that the target data type of each raw datum in the compressed data packet is the duplicate data type, the compressed data packet is stored in the direction indicated by the arrow in FIG. 2. The first total data bit number of the raw data pux, puy, puh, and puw of the duplicate data type can be 4000 bits. The storage bit width is fixed at 20 bits. A storage bit width for a data bit width (40 bits) is fixed at 10 bits.

If it is determined that the target data type of each raw datum in the compressed data packet is the first data type, then the compressed data packet is stored in the order shown in FIG. 2. The storage bit width of the raw datum mv with a bit width of 20 bits and the storage bit width of the preset difference bit width with a bit width of 5 bits are all fixed at 8 bits. The storage bit width of total data bit number of all data difference after compression is fixed at 20 bits. The total data bit number of data difference is 27000 bits. It is assumed that if a transmission data difference i.e., a data difference between the mvx and the immediately previously transmitted mvx is less than or equal to 5 bits and a data difference between the mvy and the immediately previously transmitted mvy is less than or equal to 5 bits, the mvdx and mvdy are transmitted. Here, the mvdx and the mvdy both represent a data difference. When the mvdx, the mvdy and the valid identification code are stored, the valid identification bit can be stored first for each time, and the valid identification bit has a bit width of 2 bits. Then, the corresponding mvdx (or mvx) and mvdy (or mvy) are stored.

In the embodiment, the raw data mv (mvx, mvy) is stored when the bit width of the valid identification bit is 1, and the data difference {mvdx, mvdy} is stored when the bit width of the valid identification bit is 0. For example, if the valid identification bit is [2'b10], then {mvx, mvdy} is stored; if the valid identification bit is [2'b00], then {mvdx, mvdy} is stored; if the valid identification bit is [2'b11], then {mvx, mvy} is stored.

If it is determined that the target data type of each raw datum in the compressed data packet is the second data type, the array identification code is stored first, and the compressed data packet is stored in the order shown in FIG. 2 if it is needed to transmit the indexed array MAP, and the indexed address identification code is stored directly and then the indexed address value is stored if it is not needed to store the indexed array. When storing the indexed address corresponding to the raw datum predH and the indexed address corresponding to the raw datum predW, the indexed address value corresponding to predHis stored first and then before the indexed address value corresponding to predW is stored. Each value in the indexed array MAP has a bit width of 6 bits, the fourth total data bit number of all the indexed address value in the indexed array is 3 bits, the storage bit width of the fourth total data bit number and the storage bit width of the bit width of each value are all fixed at 6 bits. The storage bit width of the third total data bit number (48 bits in this packet) of the indexed array MAP is fixed at 10 bits. The storage bit width of the fourth total data bit number (6000 bits in this packet) of all the indexed address value in the indexed array is fixed at 20 bits.

If multiple data packets are transmitted, when the second data type is stored for subsequent packets, only the indexed address identification code, the bit width of each value in the indexed array, the indexed array, the indexed address identification code, the forth total data bit number of all the indexed address value in the indexed array, the bit width of each indexed address value in the indexed array, the target indexed address value, and the data type end identification code corresponding to the raw datum conforming to the second data type are stored.

If it is determined that the target data type of each raw datum in the compressed data packet is the third data type, the compressed data packet is stored in the order shown in FIG. 2. The storage bit width of the fifth total data bit number (80000 bits in this packet) of the raw datum conforming to the third data type is fixed at 20 bits.

When the duplicate data type, the first data type, the second data type and the third data type are stored in this order, if the 128-bits memory space for the current bus clock cycle is full, but there is still remaining data in the raw data of the data type being stored, then the remaining data of the current data type is stored in the next bus clock cycle. When the raw data of each data type are all stored, the data type end identification code is stored and it continues the cyclic storage operation for each data type until the raw data corresponding to all data types are stored in memory. When all the data is stored, the remaining storage space for the current bus clock cycle is filled with 0, and the data packet end identification code is stored in the next bus clock cycle and the remaining storage space is filled with 0 again. The storage of the whole data packet is finished. When the IP core interacts with the AXI bus, the compressed data packet stored in the memory is sent in to the bus.

Therefore, the total bit number of data in the compressed data packet that is needed to be transmitted is 128+(10+20+10+40+10)+(10+2*8+20+27000+10)+(10+6*2+8*2+10+20+6048+10)+(10+20+80000+10)+128=113568 bits. 113568/128=888 bus clock cycles are needed by 128-bits AXI bus transmission. The rate of compression of the raw data in the data packet can be calculated as 64.5%.

In some embodiments, the data packet is a data packet to be decoded, and the determining the target data type corresponding to each raw datum in the data packet includes: obtaining a data type identification code in the data packet; and determining the target data type corresponding to each raw datum based on the data type identification code. Specifically, an IP core stores a compressed data packet in its memory first when receiving the compressed data packet, and then reads the compressed data packet from memory to recover the compressed data packet. When the compressed data packet is recovered, different target data types correspond to different data decoding modes. Therefore, it is needed to determine the target data type corresponding to each raw datum in the data packet. Due to the fact that after the data packet is compressed, an identification code is set for the compressed data packet based on the target data type corresponding to each raw datum in the data packet, therefore an data type identification code in the data packet is read from memory, and then the target data type corresponding to each raw datum is determined based on the data type identification code, that is comparing the data type identification code in the data packet that has been readout with the identification code set for each raw datum, so as to determine the target data type corresponding to each raw datum to carry out corresponding data decoding strategies for different target data types.

For example, the data of the first bus clock cycle is parsed first. When it is detected whether the first 32-bits data is packet start identification code, all data of the current bus clock cycle is read. The total bit number of all the data of the current bus clock cycle is 128 bits, and then 10-bits data is read. The 10-bits data that has been read is the data type start identification code. At the same time, the 10-bits data is matched with four data type start identification codes to determine the target data type corresponding to each raw datum.

In some embodiments, the target data processing mode corresponding to each raw datum is determined based on the data processing requirement for the data packet and the target data type corresponding to each raw datum in the data packet. Specifically, when an IP core receives the compressed data packet, it stores the compressed data packet into its memory first, and then read the compressed data packet from the memory to recover the compressed data packet. When the data processing requirement is data decoding, different target data types correspond to different data decoding modes. If the data processing requirement is data decoding and the target data type is the duplicate data type, that is, data decoding is performed on the received compressed data packet and it is determined that the target data type of each raw datum in the compressed data packet is the duplicate data type, thus it is determined that the target data processing mode of the raw datum is the first data decoding mode, and then the raw datum conforming to the duplicate data type is recovered by the first data decoding mode to obtain the raw datum conforming to the duplicate data type in the data packet. Therefore, the decoding of the raw datum of the duplicate data type is achieved by the first data decoding mode.

In an embodiment, the first data decoding mode is implemented by: obtaining a first total data bit number of the raw datum that conforms to the duplicate data type and a bit width of a first valid data in a single transmission from the memory; continuously extracting data based on the bit width of the first valid data, until a bit width accumulated total of each extracted first valid data reaches the first total data bit number; detecting a data type end identification code corresponding to the raw datum that conforms to the duplicate data type, the data type end identification code indicating that reading of the raw datum of the duplicate data type is finished; and performing data recovery on the raw datum that conforms to the duplicate data type based on the first total data bit number and the bit width of the first valid data to obtain the raw datum conforming to the duplicate data type in the data packet.

For example, if the data type identification code corresponding to the raw datum conforming to the duplicate data type in the data packet is read from the memory, it is determined that the target data type of each raw datum in the compressed data packet is the duplicate data type. Then 30-bits data is read to obtain the first total data bit number of the raw datum conforming to the duplicate data type and the bit width of the first valid data in a single time transmission in the data packet. The first total data bit number can be 40000 bits. Then 40-bits data is read to obtain the first valid data in a single transmission in the raw datum conforming to the duplicate data type. Finally, the data type end identification code corresponding to the raw datum conforming to the duplicate data type in the data packet is detected. The parsing of the raw datum conforming to the duplicate data type is finished.

In some embodiments, the target data processing mode corresponding to each raw datum is determined based on the data processing requirement for the data packet and the target data type corresponding to each raw datum in the data packet. Specifically, when an IP core receives a compressed data packet, it stores the compressed data packet into the memory first. Then the compressed data packet is read from the memory to recover the compressed data packet. The data processing requirement is data decoding, and different target data types correspond to different data decoding modes. If the data processing requirement is data decoding and the target data type is the first data type, that is, if the compressed data packet that is received will be subject to data decoding and if it is determined that the target data type of each raw datum in the compressed data packet is the first data type, the target data processing mode corresponding to the raw datum is the second data decoding mode. Then the raw datum conforming to the first data type is subject to data recovery by the second data decoding mode to obtain the raw datum conforming to the first data type in the data packet. Therefore, the decoding of the raw datum of the first data type is achieved through the second data decoding mode.

In an embodiment, the second data decoding mode is implemented by: obtaining, from the memory, a second total data bit number of the raw datum that conforms to the first data type, a preset difference bit width, and an original data bit width; performing a first extraction step to extract an valid identification bit and extract the raw datum corresponding to the valid identification bit based on the valid identification bit; performing cyclically the first extraction step until a bit width accumulated total of each compressed data that is extracted reaches the second total data bit number; detecting a data type end identification code corresponding to the raw datum that conforms to the first data type; and performing data recovery on the raw datum corresponding to the valid identification bit based on the valid identification bit.

For example, if the data type identification code corresponding to the raw datum conforming to the first data type in the data packet is read from the memory, it is determined that the target data type of each raw datum in the compressed data packet is the first data type. Then 36-bits data is read from the memory to obtain the second total data bit number, the preset difference bit width and the original data bit width.

The second total data bit number can be 27000 bits. Then 2-bits data is read to extract the valid identification bit, the raw datum corresponding to the valid identification bit based on is extracted based on the valid identification bit. The raw datum corresponding to the valid identification can be mvdx or mvx, and mvdy or mvy, until the cumulative sum of the bit width of the extracted compressed data reaches the second total data bit number. Finally, the data type end identification code corresponding to the raw datum conforming to the first data type is detected in the data packet. The data type end identification code indicates that reading of the raw datum of the first data type is finished. The parsing of the raw datum conforming to the first data type is finished.

In some embodiments, data recovery is performed on compressed data corresponding to the valid identification bit based on the valid identification bit. That is, after compressing the raw datum conforming to the first data type in the data packet by the second data compression mode, a valid identification bit is added to each compressed data. The compressed data can be a data difference or the raw datum of the first data type. The valid identifier corresponding to the data difference and the valid identifier corresponding to the raw datum of the first data type are different. Therefore, the valid identification bit can be used to determine whether the compressed data is the data difference. If it is determined, based on the valid identification bit, that the raw datum corresponding to the valid identification bit is the data difference, the data difference is added with the immediately previous recovered datum to obtain the recovered datum of the raw datum corresponding to the valid identification bit. The immediately previous recovered datum is recovered datum corresponding to the immediately previous raw datum conforming to the first data type. If it is determined, based on the valid identification bit, the raw datum corresponding to the valid identification bit is the raw datum, data processing is not performed. Therefore, data recovery on the compressed data corresponding to the valid identification bit is performed based on the valid identification bit.

In some embodiments, the target data processing mode corresponding to each raw datum is determined based on the data processing requirement for the data packet and the target data type corresponding to each raw datum in the data packet. Specifically, when an IP core receives a compressed data packet, it stores the compressed data packet into it memory first. Then the compressed data packet is read from the memory to recover the compressed data packet. Under the condition that the processing requirement is data decoding and different data types correspond to different data decoding modes, if the data processing requirement is data decoding and the target data type is the second data type, that is, if data decoding is performed on the compressed data packet that is received and if it is determined that the target data type of each raw datum in the compressed data packet is the second data type, the target data processing mode corresponding to the raw datum is determined to be the third data decoding mode. Then data recovery is performed on the raw datum conforming to the second data type based on the third data decoding mode to obtain the recovered datum corresponding to the raw datum conforming to the second data type. Therefore, the decoding of the raw datum of the second data type is achieved by the third data decoding mode.

The third data decoding mode is implemented by: sequentially extracting, under the condition that an array identification code is detected, a third total data bit number of all exhaustible values in the indexed array, a bit width of each value in the indexed array, and the indexed array (that is to way, when an IP core transmits the raw datum conforming to the second data type in the data packet for the first time, the IP core takes the indexed array and the target indexed address value as the compressed datum of the raw datum conforming to the second data type, then transmits the compressed raw datum conforming to the second data type. When another IP core receives the compressed raw datum conforming to the second data type, the other IP core stores the compressed raw datum that conforms to the second data type based on the third data storage mode. When the other IP core recovers the raw datum conforming to the second data type, it sequentially extracts a third total data bit number of all exhaustible values in the indexed array, a bit width of each value in the indexed array, and the indexed array from the memory); extracting from the memory, under the condition that an indexed address identification code is detected (that is, reading the index identification code from the memory, indicating that the memory stores the indexed array for the first time), a fourth total data bit number of all indexed address values in the indexed array and a bit width of each indexed address value in the indexed array; cyclically extracting, in the bit width of each indexed address value in the indexed array, the target indexed address value until a bit width accumulated total of each extracted target indexed address value reaches the fourth total data bit number; detecting from the memory the data type end identification code corresponding to the raw datum that conforms to the second data type, the data type end identification code indicating that the reading of the raw datum of the second data type is complete; searching and mapping the indexed array based on the target indexed address value to obtain recovered datum corresponding to the raw datum that conforms to the second data type, since each exhaustible value of the raw datum conforming to the second data type in the packet has a corresponding indexed address value in the indexed array. In this way, the decoding of the raw datum of the second data type is achieved by the third data decoding mode.

For example, when the raw datum conforming to the second data type is subject to data recovery, if the array identification code is read after the data type identification code corresponding to the raw datum conforming to the second data type is read, then 16-bits data is from the memory to obtain the forth total data bit number of all the indexed array value in the indexed array and the bit width of each indexed address value in the indexed array, here the forth total data can be 48 bits. Then, 48-bits data can be read from the memory to obtain the indexed array. 8-bits data is read after the indexed array is obtained, here the indexed address identification code has bit width of 8 bits. Then it checks whether the data is the indexed address identification code. If it is, 26-bits data is read to obtain the fourth total data bit number of all the indexed address value in the indexed array and the bit width of each indexed address value in the indexed array. The fourth total data bit number can be 6000 bits in the data packet. The target indexed address value is then circularly extracted from the memory with the bit width of each indexed address value, until a bit width accumulated total of the bit width of each extracted target indexed address value reaches 6000 bits. When the data type end identification code corresponding to the raw datum conforming to the second data type is detected, the parsing of the raw datum conforming to the second data type is ended.

In an embodiment, the third data decoding mode is as follows. Under the condition that the array identification code is not detected and the indexed address identification code is detected, that is in the case in which there is no need to transfer the indexed array repeatedly on the premise that the indexed array has been stored in the memory and thus the existing indexed array can be used when data recovery is performed on the raw datum of the second data type, the forth total data bit number of all the indexed address values in the indexed array and a bit width of each indexed address value in the indexed array are extracted from the memory. Then, the target indexed address value is cyclically extracted from the memory in the bit width of each indexed address value until a bit width accumulated total of each extracted target indexed address value reaches the fourth total data bit number. When the data type end identification code corresponding to the raw datum conforming to the second data type is detected and the data type end identification code indicates that the reading of the raw datum of the second data type is complete, the indexed array can be searched and mapped based on the target indexed address value to obtain recovered datum corresponding to the raw datum that conforms to the second data type since each exhaustible value of the raw datum conforming to the second data type in the packet has a corresponding indexed address value in the indexed array. Therefore, the decoding of the raw datum of the second data type is achieved by the third data decoding mode.

For example, when data recovery is performed on the raw datum conforming to the second data type, if the indexed address identification code is read after the data type identification code corresponding to the raw datum conforming to the second data type is read, then 26-bits data is read from the memory to obtain the forth total data bit number of all the indexed address values in the indexed array and the bit width of each indexed address value in the indexed array. Then the target indexed address values are read continuously based on the bit width of each indexed address value until the bit width accumulated total of the extracted multiple target indexed address values reaches the fourth total data bit number. When the data type end identification code corresponding to the raw datum conforming to the second data type is detected, the parsing of the raw datum conforming to the second data type is ended.

In some embodiments, the target data processing mode corresponding to each raw datum is determined based on the data processing requirement for the data packet and the target data type corresponding to each raw datum in the data packet. Specifically, when an IP core receives the compressed data packet, the IP core stores the compressed data packet into the memory first. Then, the IP core reads the compressed data packet from the memory to recover the compressed data packet. Under the condition that the data processing requirement is data decoding and different target data types correspond to different data decoding modes, if the data processing requirement is data decoding and the target data type is the third data type, that is if data decoding is performed on the compressed data packet received and it is determined that the target data type of each raw datum in the compressed data packet is the third data type, it is determined that the target data processing mode corresponding to the raw datum as the forth data decoding mode. Then the raw datum conforming to the third data type is recovered by the fourth data decoding mode. The fourth data decoding mode is as follows. A fifth total data bit number of the raw datum conforming to the third data type is extracted from the memory, and the raw datum is extracted based on the fifth total data bit number, that is the raw datum conforming to the third data type of the fifth total data bit number is extracted. When the data type end identification code corresponding to the raw datum conforming to the third data type is read, and the data type end identification code indicates that reading of the raw datum of the third data type is complete, since the raw datum conforming to the third data type in the data packet is not compressed, all the raw data extracted shall be regarded as the recovered datum corresponding to the raw datum conforming to the third data type. Therefore, the data recovery of the raw datum conforming to the third data type in the data packet is ended.

For example, if the data type identification code corresponding to the raw datum conforming to the third data type in the data packet is read from the memory, it is determined that the target data type of each raw datum in the compressed data packet is the third data type. Then, 20-bits data is read to obtain the fifth total data bit number of the raw datum conforming to the third data type in the data packet. The fifth total data bit number can be 8000 bits. Furthermore, data is continuously read until the total bit number of extracted data reaches 80000 bits. When the data type end identification code corresponding to the raw datum conforming to the third data type is read, the parsing of the raw datum conforming to the third data type is ended.

When the raw data of the four data types are decoded, after the data type end identification code is detected, it continues to detect 10-bits data, here the 10-bits data that is read is the data type start identification code. Meanwhile, the 10-bits data is matched with the remaining data type identification codes, and the process of data decoding is repeated until the raw data of the four data types are all read. After reading the raw data of all data types, the remaining data of the current bus clock cycle is read, and detecting of the first 32-bits data for the next bus clock cycle is performed to determine whether the data is the data packet end identification code. If it is, it is determined that the parsing of the current data packet is complete.

In the embodiment, the target data type of each raw datum in the compressed data packet is determined, and then the data decoding mode corresponding to the target data type of each raw datum is determined. By the decoding of raw data of each data type based on the data decoding mode, the recovered datum corresponding to the raw datum conforming to the data type is obtained. The address information of each raw datum is obtained from the compressed data packet, then the data packet is recovered based on the recovered data corresponding to the raw data of the data type and the address information, and the data packet is output based on the data type of the raw data.

It is assumed that this embodiment is applied to the hardware implementation of the video codec SOC chip. The Overapplied Block Motion Compensation (OBMC) algorithm for implementing Decoding interframe prediction in AV1 Format by chip hardware is taken as an example. This type of algorithm needs to obtain the information of the interframe prediction unit (PU-PR) related to the algorithm and the relevant parameters of the algorithm through the code stream parsing process. It is assumed that the above relevant information and parameter data are compressed, the compressed data is cached by AXI bus. When the algorithm processing unit of the decoder decodes the corresponding prediction unit, the relevant data is read through the AXI bus to complete the decoding.

In an embodiment, when a data packet is transmitted by a bus, the unit of data package is in the form of PU (Precondition Unit). The start access and end access of each data packet are marked by the PU data packet start identification code and the PU data packet end identification code respectively. In the process of data packet transmission, the access to variable length continuous data is realized through the AXI bus with a bit width of 128 bits. The raw data in the data packet are all special data which is needed for algorithm implementation and are all defined specifically in the spec document of AV1 standard, for example, duplicate data type, the raw datum in the data packet that meets the condition in which the data difference between the raw datum to be transmitted currently and the immediately previous raw datum to be transmitted is less than a preset threshold, the second data type represents the raw datum in the data packet that satisfies the condition that data volume in a single transmission is greater than a preset data volume and values of the raw datum are exhaustive. The raw data includes the coordinate (pux, puy) of PU, width and height (puw, puh) and width and height of prediction unit (predW, predH), and motion vector (mvx, mvy) etc. The raw data of the above data types needs to be centrally mixed into one data packet that is accessed through the on-chip bus in the chip cache region. each raw datum can be compressed based on the target data type of the raw data in the data packet to reduce transmission bandwidth and memory space, and improve the transmission efficiency.

Figure 3:
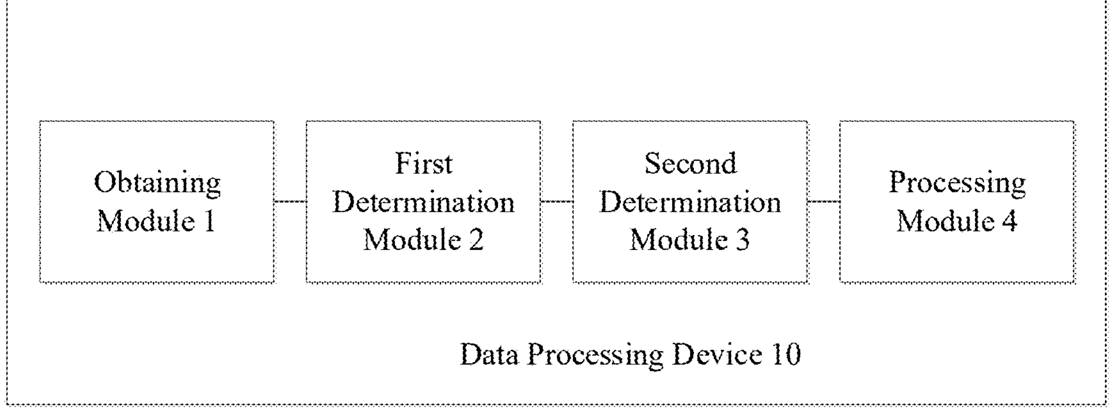
FIG. 3 is a structural block diagram of a data processing device according to an embodiment of the present disclosure.

An embodiment in a second aspect of the present disclosure provides a data processing device, as shown in FIG. 3. The data processing device 10 includes an obtaining module 1, a first determination module 2, a second determination module 3, and a processing module 4.

The obtaining module 1 is configured to obtain a data packet including multiple raw data. The first determination module 2 is configured to determine a target data type corresponding to each raw datum in the data packet. The second determination module 3 is configured to determine a target data processing mode corresponding to each raw datum based on a data processing requirement for the data packet and the target data type corresponding to each raw datum in the data packet, the data processing requirement including at least one or more of data compression, data storage, and data decoding. The processing module 4 is configured to perform data processing on each raw datum based on the target data processing mode corresponding to each raw datum.

The data processing device according to the embodiment of the present disclosure can ensure the integrity of the compression of mixed data, reduce A bandwidth and storage space occupied by transmission of the compressed data packet can be implemented in a relatively simple way.

Figure 4:
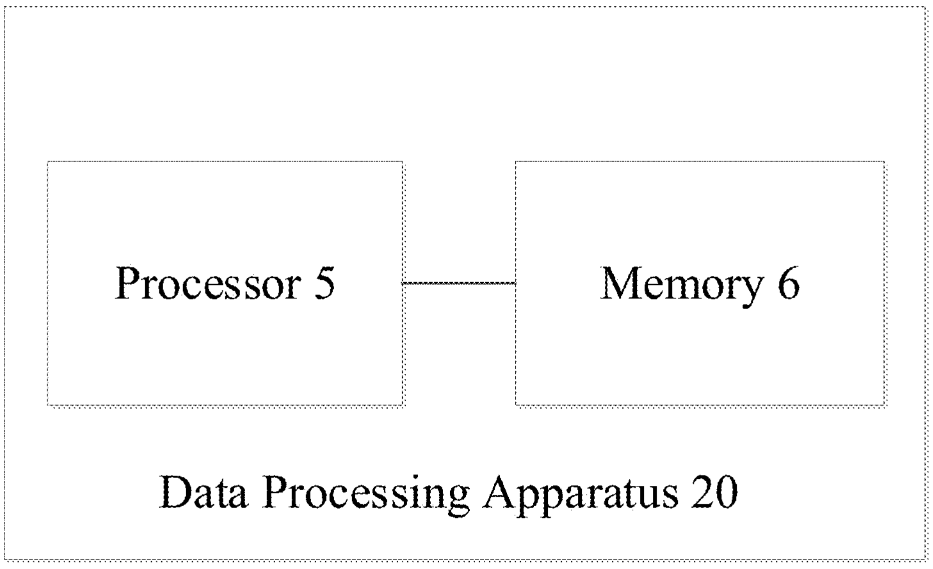
FIG. 4 is a structural block diagram of a data processing apparatus according to an embodiment of the present disclosure.

An embodiment in a third aspect of the present disclosure provides a data processing apparatus 20, as shown in FIG. 4. The data processing apparatus 20 includes at least one processor 5 and a memory 6 in communication connection with the at least one processor.

The memory stores a computer program executable by the at least one processor, and the computer program when executed by the at least one processor implements the data processing method according to any of the above embodiments.

The data processing apparatus according to the embodiment of the present disclosure can ensure the integrity of the compression of the mixed data, can reduce a bandwidth and storage space occupied by transmission of the compressed data packet, and can be implemented in a relatively simple way.

An embodiment in a fourth aspect of the present disclosure provides a non-transitory computer storage medium on which a computer program is stored. The computer program, when executed by a processor, implements the data processing method according to any one of the above embodiments.

In the specification of the disclosure, any process or method described in a flow chart or described herein in other ways may be understood to include one or more modules, segments or portions of codes of executable instructions for achieving specific logical functions or steps in the process, and the scope of a preferred embodiment of the disclosure includes other implementations, which may not be performed in the order shown or discussed, including in a substantially simultaneous manner or in a reverse order according to involved functions, and should be understood by those skilled in the art to which the embodiments of the present disclosure belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the disclosure may be achieved by commanding the related hardware with programs. The programs may be stored in a computer readable storage medium, and the programs include one or a combination of the steps in the method embodiments of the disclosure when run on a computer.

In addition, each function cell of the embodiments of the disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although the embodiments of the disclosure have been shown and described above, it should be understood that the above embodiments are exemplary and should not be construed as limiting the disclosure. Those skilled in the art may change, modify, and substitute the embodiments within the scope of the disclosure.

Reference throughout this specification to "an embodiment", "some embodiments", "one embodiment", "another example", "an example", "a specific example", or "some examples" means that a particular feature, structure, material, or characteristic described in connection with the embodiment or example is included in at least one embodiment or example of the disclosure. Thus, the appearances of the phrases such as "in some embodiments", "in one embodiment", "in an embodiment", "in another example", "in an example", "in a specific example", or "in some examples" in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the disclosure, and changes, alternatives, and modifications can be made in the embodiments without departing from spirit, principles and scope of the disclosure.

What is claimed is:

1. A data processing method, comprising:

obtaining a data packet comprising multiple raw data;

determining a target data type corresponding to each raw datum in the data packet;

determining a target data processing mode corresponding to each raw datum based on a data processing requirement for the data packet and the target data type corresponding to each raw datum in the data packet, the data processing requirement comprising at least one or more of data compression, data storage and data decoding; and performing data processing on each raw datum based on the target data processing mode corresponding to each raw datum.

2. The data processing method according to claim 1, wherein said determining the target data type corresponding to each raw datum in the data packet comprises:

determining the target data type corresponding to each raw datum in the data packet based on preset data types, wherein the preset data types at least comprise a duplicate data type, a first data type, a second data type and a third data type, the first data type represents a raw datum in the data packet that satisfies a condition that a data difference between a current raw datum to be transmitted and an immediately previous raw datum to be transmitted is less than a preset threshold, the second data type represents a raw datum in the data packet that satisfies a condition that data volume in a single transmission is greater than a preset data volume and numerical values of the raw datum are exhaustible, the third data type represents other raw data in the data packet except for the raw datum conforming to the duplicate data type, the raw datum conforming to the first data type and the raw datum conforming to the second data type.

3. The data processing method according to claim 2, wherein the data packet is a data packet to be compressed, said determining the target data processing mode corresponding to each raw datum based on the data processing requirement for the data packet and the target data type corresponding to each raw datum in the data packet comprises:

determining the target data processing mode to be a first data compression mode if the data processing requirement is data compression and the target data type is the duplicate data type;

wherein the first data compression mode is implemented by:

extracting a first valid data in a single transmission from the raw datum conforming to the duplicate data type in the data packet, extracting a first total data bit number and a bit width of the first valid data of the raw datum conforming to the duplicate data type, and determining the first total data bit number, the bit width of the first valid data and the valid data in the single transmission to be a compressed datum of the raw datum conforming to the duplicate data type.

4. The data processing method according to claim 2, wherein said determining the target data processing mode corresponding to each raw datum based on the data processing requirement for the data packet and the target data type corresponding to each raw datum in the data packet comprises:

determining the target data processing mode to be a second data compression mode if the data processing requirement is data compression and the target data type is the first data type;

wherein the second data compression mode is implemented by:

obtaining a preset difference bit width;

determining, for a raw datum that conforms to the first data type and satisfies a condition that the data difference is within a range represented by the preset difference bit width, the data difference to be compressed datum of the raw datum conforming to the first data type;

determining, for a raw datum that conforms to the first data type and satisfies a condition that the data difference is not within the range represented by the preset difference bit width, the raw datum to be compressed datum of the raw datum conforming to the first data type; and adding a valid identification bit to each compressed datum to obtain second valid data after compression of the raw datum conforming to the first data type in the data packet, wherein the valid identification bit distinguishing whether the compressed datum is a data difference value.

5. The data processing method according to claim 2, wherein said determining the target data processing mode corresponding to each raw datum based on the data processing requirement for the data packet and the target data type corresponding to each raw datum in the data packet comprises:

determining, if the data processing requirement is data compression and the target data type is the second data type, the target data processing mode to be a third data compression mode;

wherein the third data compression mode is implemented by:

sequentially storing all exhaustible values of the raw datum conforming to the second data type into an indexed array based on indexed address values;

obtaining a target indexed address value of the raw datum conforming to the second data type; and determining the indexed array and the target indexed address value to be compressed datum of the raw datum conforming to the second data type.

6. The data processing method according to claim 2, wherein said determining the target data processing mode corresponding to each raw datum based on the data processing requirement for the data packet and the target data type corresponding to each raw datum in the data packet comprises:

determining, if the data processing requirement is data compression and the target data type is the third data type, the target data processing mode to be a fourth data compression mode, wherein the raw datum in the data packet that conforms to the third data type is not compressed in the fourth data compression mode.

7. The data processing method according to claim 2, further comprising:

setting, after data compression of the data packet, identification codes for the compressed data packet based on the target data type corresponding to each raw datum in the data packet, wherein the identification codes at least comprise data type identification code, data packet start identification code, data packet end identification code, data type end identification code, array identification code, and indexed address identification code.

8. The data processing method according to claim 7, wherein when the data processing requirement is data storage, the method comprises:

circularly storing the compressed data packet in a memory in a bus clock cycle, and sequentially storing the compressed data packet in an order of the data packet start identification code, the compressed datum of the raw datum conforming to the duplicate data type, the compressed datum of the raw datum conforming to the first data type, the compressed datum of the raw datum conforming to the second data type, the compressed datum of the raw datum conforming to the third data type, and the data packet end identification code during the data storage.

9. The data processing method according to claim 8, wherein said determining the target data processing mode corresponding to each raw datum based on the data processing requirement for the data packet and the target data type corresponding to each raw datum in the data packet comprises:

determining, if the data processing requirement is data storage and the target data type is the duplicate data type, the target data processing mode to be a first data storage mode;

wherein the first data storage mode is implemented by:

sequentially storing, when storing compressed datum of the raw datum conforming to the duplicate data type, the data type identification code corresponding to the raw datum conforming to the duplicate data type, a first total data bit number of the raw datum conforming to the duplicate data type, a bit width of a first valid data in a single transmission in the raw datum conforming to the duplicate data type, a first valid data transmitted in a single transmission in the raw datum conforming to the duplicate data type, and the data type end identification code corresponding to the raw datum conforming to the duplicate data type in this order.

10. The data processing method according to claim 8, wherein said determining the target data processing mode corresponding to each raw datum based on the data processing requirement for the data packet and the target data type corresponding to each raw datum in the data packet comprises:

determining, if the data processing requirement is data storage and the target data type is the first data type, the target data processing mode to be a second data storage mode;

wherein the second data storage mode is implemented by:

sequentially storing, when storing the second valid data obtained after the compression of the raw datum conforming to the first data type in the data packet, the data type identification code corresponding to the raw datum conforming to the first data type, a second total data bit number of the raw datum conforming to the first data type, a preset difference bit width of the raw datum conforming to the first data type, an original data bit width of the raw datum conforming to the first data type, the second valid data, and the data type end identification code corresponding to the raw datum conforming to the first data type in this order, wherein the second valid data is "valid identification bit+data difference" or "valid identification bit+raw data".

11. The data processing method according to claim 8, wherein said determining the target data processing mode corresponding to each raw datum based on the data processing requirement for the data packet and the target data type corresponding to each raw datum in the data packet comprises:

determining, if the data processing requirement is data storage and the target data type is the second data type, the target data processing mode to be a third data storage mode;

wherein the third data storage mode is implemented by:

sequentially storing, when storing the compressed datum of the raw datum conforming to the second data type, the data type identification code corresponding to the raw datum conforming to the second data type, the array identification code, a third total data bit number of all the exhaustible values in the indexed array, a bit width of each value in the indexed array, the indexed array, the indexed address identification code, a fourth total data bit number of all indexed address values in the indexed array, a bit width of each indexed address value in the indexed array, the target indexed address value, and the data type end identification code corresponding to the raw datum that conforms to the second data type in this order under a condition that the indexed array needs to be stored.

12. The data processing method according to claim 8, wherein said determining the target data processing mode corresponding to each raw datum based on the data processing requirement for the data packet and the target data type corresponding to each raw datum in the data packet comprises:

determining, if the data processing requirement is data storage and the target data type is the second data type, the target data processing mode to be a third data storage mode;

wherein the third data storage mode is implemented by:

sequentially storing, when storing the compressed datum of the raw datum that conforms to the second data type, the data type identification code corresponding to the raw datum that conforms to the second data type, a fourth total data bit number of all indexed address values in the indexed array, a bit width of each indexed address value in the indexed array, the target indexed address value, and the data type end identification code corresponding to the raw datum that conforms to the second data type in this order under a condition that the indexed array does not need to be stored.

13. The data processing method according to claim 8, wherein said determining the target data processing mode corresponding to each raw datum based on the data processing requirement for the data packet and the target data type corresponding to each raw datum in the data packet comprises:

determining, if the data processing requirement is data storage and the target data type is a third data type, the target data processing mode to be a fourth data storage mode;

wherein the fourth data storage mode is implemented by:

sequentially storing, when storing the compressed datum of the raw datum that conforms to the third data type, the data type identification code corresponding to the raw datum that conforms to the third data type, a fifth total data bit number of the raw datum that conforms to the third data type, the raw datum that conforms to the third data type, and the data type end identification code corresponding to the raw datum that conforms to the third data type in this order.

14. The data processing method according to claim 1, wherein the data packet is a data packet to be decoded, and said determining the target data type corresponding to each raw datum in the data packet comprises:

obtaining a data type identification code in the data packet; and determining the target data type corresponding to each raw datum based on the data type identification code.

15. The data processing method according to claim 14, wherein said determining the target data processing mode corresponding to each raw datum based on the data processing requirement for the data packet and the target data type corresponding to each raw datum in the data packet comprises:

determining, if the data processing requirement is data decoding and the target data type is duplicate data type, the target data processing mode to be a first data decoding mode;

wherein, the first data decoding mode is implemented by:

obtaining a first total data bit number of the raw datum that conforms to the duplicate data type and a bit width of a first valid data in a single transmission;

continuously extracting data based on the bit width of the first valid data, until a bit width accumulated total of each extracted first valid data reaches the first total data bit number;

detecting a data type end identification code corresponding to the raw datum that conforms to the duplicate data type; and performing data recovery on the raw datum that conforms to the duplicate data type based on the first total data bit number and the bit width of the first valid data.

16. The data processing method according to claim 14, wherein said determining the target data processing mode corresponding to each raw datum based on a data processing requirement for the data packet and the target data type corresponding to each raw datum in the data packet comprises:

determining, if the data processing requirement is data decoding and the target data type is the first data type, the target data processing method to be a second data decoding mode;

wherein the second data decoding mode is implemented by:

obtaining a second total data bit number of the raw datum that conforms to the first data type, a preset difference bit width, and an original data bit width;

performing a first extraction step to extract an valid identification bit and extract the raw datum corresponding to the valid identification bit based on the valid identification bit;

performing cyclically the first extraction step until a bit width accumulated total of each compressed data that is extracted reaches the second total data bit number;

detecting a data type end identification code corresponding to the raw datum that conforms to the first data type; and performing data recovery on the raw datum corresponding to the valid identification bit based on the valid identification bit.

17. The data processing method according to claim 16, wherein said performing data recovery on compressed data corresponding to the valid identification bit based on the valid identification bit comprises:

adding, in response to determining the raw datum corresponding to the valid identification bit to be a data difference value based on the valid identification bit, the data difference value to an immediately previous recovered datum to obtain recovered datum of the raw datum corresponding to the valid identification bit, wherein the immediately previous recovered datum is recovered datum corresponding to an immediately previous raw datum that conforms to the first data type; and giving up data processing in response to determining the raw datum corresponding to the valid identification bit to be the raw datum based on the valid identification bit.

18. The data processing method according to claim 14, wherein said determining the target data processing mode corresponding to each raw datum based on the data processing requirement for the data packet and the target data type corresponding to each raw datum in the data packet comprises:

determining, if the data processing requirement is data decoding and the target data type is the second data type, the target data processing mode to be a third data decoding mode;

wherein the third data decoding mode is implemented by:

sequentially extracting, under the condition that an array identification code is detected, a third total data bit number of all exhaustible values in the indexed array, a bit width of each value in the indexed array, and the indexed array;

extracting, under the condition that an indexed address identification code is detected, a fourth total data bit number of all indexed address values in the indexed array and a bit width of each indexed address value in the indexed array;

cyclically extracting the target indexed address value until a bit width accumulated total of each extracted target indexed address value reaches the fourth total data bit number;

detecting the data type end identification code corresponding to the raw datum that conforms to the second data type; and searching and mapping the indexed array based on the target indexed address value to obtain recovered datum corresponding to the raw datum that conforms to the second data type.

19. A data processing apparatus, comprising:

at least one processor; and a memory in communication connection with the at least one processor;

wherein the memory stores a computer program executable by the at least one processor, and the computer program when executed by the at least one processor implements the data processing method according to claim 1.

20. A non-transitory computer storage medium on which a computer program is stored, wherein the computer program, when executed by a processor, implements the data processing method according to claim 1.

* * * * *